Oct. 21, 1958 F. W. ROBERTS 2,857,165

SOUND RECORDING AND REPRODUCING APPARATUS

Original Filed Aug. 7, 1947 8 Sheets-Sheet 1

INVENTOR
*Frederick W. Roberts*

BY
*Curtis, Morris & Safford*
ATTORNEYS

Oct. 21, 1958 F. W. ROBERTS 2,857,165

SOUND RECORDING AND REPRODUCING APPARATUS

Original Filed Aug. 7, 1947 8 Sheets-Sheet 2

INVENTOR
FREDERICK W. ROBERTS

BY

Curtis, Morris + Safford

ATTORNEYS

Oct. 21, 1958 F. W. ROBERTS 2,857,165

SOUND RECORDING AND REPRODUCING APPARATUS

Original Filed Aug. 7, 1947 8 Sheets-Sheet 3

INVENTOR
Frederick W. Roberts

BY
Curtis, Morris & Safford
ATTORNEYS

Oct. 21, 1958 F. W. ROBERTS 2,857,165

SOUND RECORDING AND REPRODUCING APPARATUS

Original Filed Aug. 7, 1947 8 Sheets-Sheet 4

INVENTOR
*Frederick W. Roberts*

BY *Curtis, Morris + Safford*
ATTORNEYS

SOUND RECORDING AND REPRODUCING APPARATUS

Original Filed Aug. 7, 1947 8 Sheets-Sheet 5

INVENTOR
Frederick W. Roberts

BY
Curtis, Morris & Safford
ATTORNEYS

Oct. 21, 1958 F. W. ROBERTS 2,857,165

SOUND RECORDING AND REPRODUCING APPARATUS

Original Filed Aug. 7, 1947 8 Sheets-Sheet 6

INVENTOR
FREDERICK W. ROBERTS

BY Curtis, Morris + Safford
ATTORNEYS

Oct. 21, 1958 F. W. ROBERTS 2,857,165

SOUND RECORDING AND REPRODUCING APPARATUS

Original Filed Aug. 7, 1947 8 Sheets-Sheet 7

INVENTOR
FREDERICK W. ROBERTS

BY
Curtis, Morris + Safford
ATTORNEYS

INVENTOR
FREDERICK W. ROBERTS
BY
Curtis, Morris & Safford
ATTORNEYS 2,857,165
Patented Oct. 21, 1958

2,857,165

SOUND RECORDING AND REPRODUCING APPARATUS

Frederick W. Roberts, Fairfield, Conn., assignor to Dictaphone Corporation, Bridgeport, Conn.

Original application August 7, 1947, Serial No. 767,210. Divided and this application May 13, 1954, Serial No. 430,716

8 Claims. (Cl. 274—4)

This invention relates to sound recording and reproducing apparatus, and more particularly to apparatus of this type using a record in the form of a rectangular sheet which is unbreakable and which may be readily filed, folded, and mailed without injury.

This application is a division of a copending application of F. W. Roberts et al., Serial No. 767,210, filed August 7, 1947.

In the past, sound recording and reproducing machines have been proposed using record media having such characteristics, but such machines have not proved to be practical, both because suitable record materials were not available and because the mechanisms proposed for handling such record media were complex and inefficient, if not inoperative.

Recent scientific progress has produced record material in the form of thin flexible sheets of plastic and of coated or impregnated paper on which satisfactory sound record tracks can be placed. One such material is a magnetic record medium taking the form of a paper sheet having a magnetizable coating on one face. Thin sheets of cellulose acetate and similar plastics also are now readily available for this purpose.

It is an object of this invention to provide a simple and practical mechanism for handling rectangular sheets of flexible recording media of this type, and to provide sound recording and reproducing machines incorporating such record handling mechanisms.

It is the further object of this invention to provide sound recording and reproducing apparatus of the dictating machine variety which utilizes such unbreakable, filable, foldable and mailable rectangular record sheet material with the same facility and minimum of controls customarily incorporated in such devices which now are in widespread use in business offices.

These and other apparent objects and advantages of the invention will be in part obvious and in part pointed out hereinafter.

The invention, accordingly, consists of the features of construction, combinations of elements, and arrangements of parts as will be exemplified in the structure to be hereinafter described and the scope of which will be indicated in the following claims.

One of the various possible embodiments of the inventions is shown in the accompanying drawings, in which.

Figure 1:
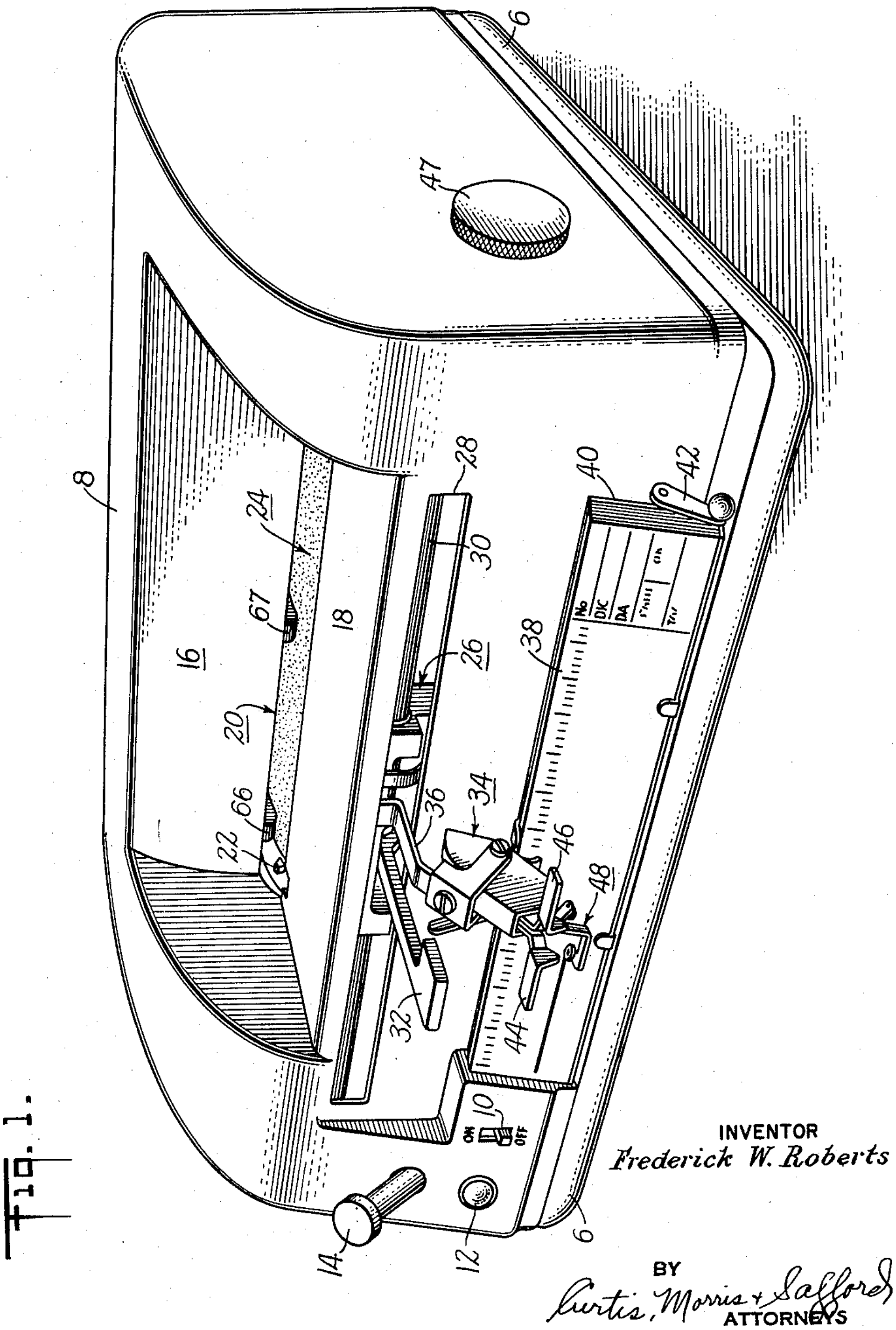
Figure 1 is a perspective view of a dictating machine embodying the inventions adapted to use as a magnetic record medium a rectangular sheet of paper having a magnetizable coating.
Figure 4:
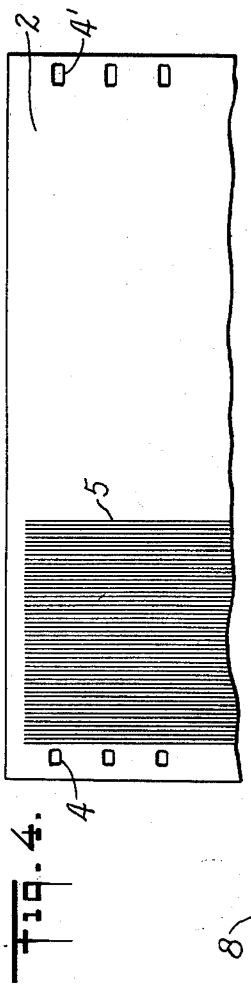
Figure 4 is a plan view showing the general layout of the ends of a rectangular record sheet adapted for use with the machine of Figure 1.

Referring to Figure 1, there is shown in perspective the external view of an office dictating machine embodying the present inventions adapted to utilize a record in the form of a rectangular paper sheet having a suitable magnetizable coating. This machine is adapted to use as a record, a sheet of such material 8½″ wide and 11″ long, these dimensions being chosen because they are those of the generally accepted standard business letter paper. Referring for the moment to Figure 4, there is shown the top portion of one such paper record sheet 2 having three rectangular guide or sprocket holes 4 and 4′ running downwardly along each side of the sheet. These holes cooperate with pins or sprocket teeth on a record drum, as will hereinafter be described, to hold the record sheet in proper alignment and drive it past the recording and reproducing head.

This machine has a base member 6 on which the various elements of the machine are mounted and suitably concealed by a housing 8 surrounding these elements, and it is equipped with devices for effecting all of the controls usually provided in standard business dictating machines. Mounted on the lower left-hand portion of the face of the housing 8 is a main power switch 10 for turning the machine on and off. Next to this switch 10 is a signal light 12 for indicating the operating condition of the machine. Immediately above the switch 10 and signal light 12 is a record "inject" or loading plunger 14 projecting through the front of the housing 8. When this plunger is pushed it puts into operation an automatic loading arrangement, described in detail in the above-mentioned copending application, which pulls the rectangular sheet record 2 into the machine and wraps it in proper position for recording around the record mandrel or drum, generally indicated at 24. To permit this, the housing 8 is provided with a recessed portion, generally indicated at 16, having a horizontal shelf-like portion 18 terminating in a slot, generally indicated at 20. The perforated end of a record sheet 2 is placed on the shelf 18 so that the first of the sprocket holes 4 and 4′ cover the first of a series of sprocket teeth 22 mounted along the edges of the record drum 24 on which the record is wrapped during operation, all as will be described in greater detail hereinafter. When the record loading plunger 14 is pushed to initiate operation of the automatic loading mechanism, the record sheet is pulled through the slot 20 by the pins 22 and is wrapped accurately around the drum 24 preparatory to recording. A carriage, shown only partially through a longitudinal slot 28 in the front face of housing 8, and generally indicated at 26, is slidably mounted, as will hereinafter be described, on two carriage guide rods, one of which is shown in Figure 1 through the slot 28 at 30. This carriage 26 traverses a magnetic recording head, not shown in Figure 1, longitudinally across the face of the record sheet 2 to produce a spiral sound track thereon when it is wrapped around the drum 24 in the form of a cylinder.

A control lever 32 is provided at the front of the machine to condition it for recording or reproducing, or to put it in neutral condition when desired. This control lever 32 is pivotally mounted on the carriage 26 and projects forwardly through the slot 28 in the front face of the housing 8. When this lever is in the position shown in Figure 1 the machine is in "neutral" condition. When this lever 32 is depressed, the machine is in condition for "recording," and when it is raised to a position above that shown, the machine is in condition for "reproducing." A correction indicator mechanism, generally indicated at 34, is also secured to carriage 26 by a bracket 36 which extends through the slot 28 in the front face of the housing 8. This correction indicator mechanism 34, which may be any suitable structure of the type known in the art such as that shown in U. S. Patent No. 2,135,470 to J. E. Renholdt, cooperates with a correction pad 38 positioned along the lower front face of the machine. This correction pad 38 rests in a pad receptacle 40 and is held in place thereon by a suitable clamping mechanism (not shown) actuated by a crank-like lever 42. As is customary, this correction mechanism 34 carries two pivoted levers 44 and 46 with which suitable indications of "corrections" and "length of letter" may be made on pad 38. The bracket 36 also carries a "progress of recording" indicator, generally indicated at 48, which will be described hereinafter.

Figure 16:
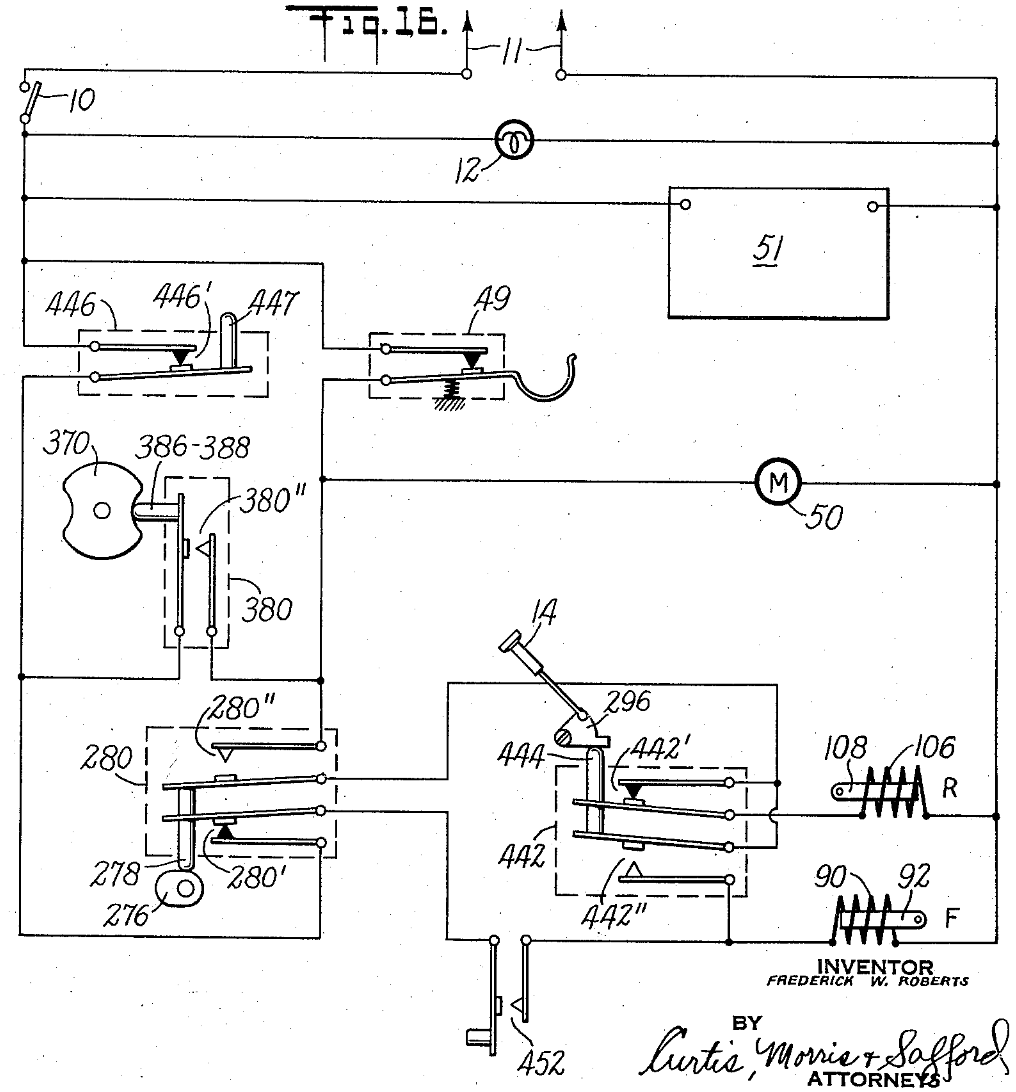
Figure 16 shows diagrammatically the electrical circuit of this machine.

As is the custom in office dictating machines, this machine is provided with a suitable sound translating device (not shown), such, for example, as a hand-held combination microphone and loudspeaker unit, or such a combination unit mounted on a stand for desk use. It is also provided with control switches for operating a suitable clutch mechanism, hereinafter to be described, for starting and stopping rotation of the record supporting mandrel 24 during recording or reproducing. If a hand-held microphone-loudspeaker unit is used, such a control switch may take the form of a thumb-button on this unit, such as that shown in U. S. Patent No. 2,367,413 to J. M. Lucarelle; whereas, if a desk type microphone-loudspeaker unit is used, a suitable foot switch may be provided for operating the clutch mechanism, such, for example, as that shown in U. S. Patent No. 2,374,561 to L. D. Norton et al. Further, in accordance with the usual practice in machines of this type, in order to conserve power when not actually recording or reproducing, a switch is provided to keep the motor turned off on all other occasions. This switch may take the form of a hook or cradle switch (as is diagrammatically indicated in Figure 16 at 49) mounted on the left side of the machine where the microphone unit may be hung when not in use, or of an auxiliary switch in the foot control mechanism such as that described in the above-mentioned U. S. Patent No. 2,374,561. In order to provide electrical power for operating the machine, it is connected by the usual cable (not shown) to a suitable power supply as is illustrated diagrammatically at 11 in Figure 16.

In order to simplify the understanding of the details of construction of this machine, it seems desirable to provide a description of its manner of operation so as to point out the various functions which are performed by the inter-related operation of its various elements.

When the power switch 10 is turned on, the signal light 12 lights to show that power has been applied to the machine, and an electronic amplifier unit mounted in the machine as will be hereinafter described, is energized. When a paper record sheet 2 is placed on the shelf 18 in the front of housing 8, with the first of the sprocket holes 4 meshing with the first of the sprocket pins 22 on the drum 24 and the loading plunger 14 is pressed, an automatic record loading mechanism comes into play which operates the clutch mechanism to connect the record drum 24 to the driving motor. This causes the drum 24 to rotate to pull the sheet 2 of record paper into the machine and wrap it around the drum 24. At this time, an automatic indexing mechanism becomes effective to stop rotation of the record drum after it has revolved sufficiently completely and smoothly to wrap the record sheet therearound. Thereafter, while a sound record is being made, the recording is started and stopped by clutching and unclutching the drive between the motor and the record drum 24.

If at any time during the recording it is desired to listen back to matter already recorded, control lever 32 is lifted to neutral position, used to slide the carriage back to the desired point as indicated on the pad 38, and then lifted to its upper position for reproducing. When the desired portion has been heard, the lever 32 is pushed downwardly to its "record" position and recording is continued. When the recording is finished, or when the record sheet is completely filled, the control lever 32 is moved into neutral position and the carriage 26 is moved back by hand to its extreme left-hand position. Upon reaching this position, it initiates an automatic record ejecting and indexing cycle. This is achieved by a control mechanism described in detail in the above-mentioned copending application, which causes the drum 24 to revolve in reverse direction to eject the record sheet through the slot 20 and onto the shelf 18, so that the operator may pick it up and pass it on to be transcribed by a typist. At the same time this mechanism causes the drum 24 to continue reverse rotation past the point where the record sheet is completely clear of the machine to an indexing position where it is latched in place so that the sprocket pins 22 are in proper position to receive the next sheet of record paper so that the cycle of operations may be repeated.

Now that the overall features and functions of this machine embodying the inventions has been described in general terms, various portions of the mechanism will be considered in detail. In order that these details may be more readily understood, the following description of the construction and operation of the machine will be subdivided into several sections, each relating to a portion of the mechanism performing a major function.

*Driving mechanism*

Figure 2:
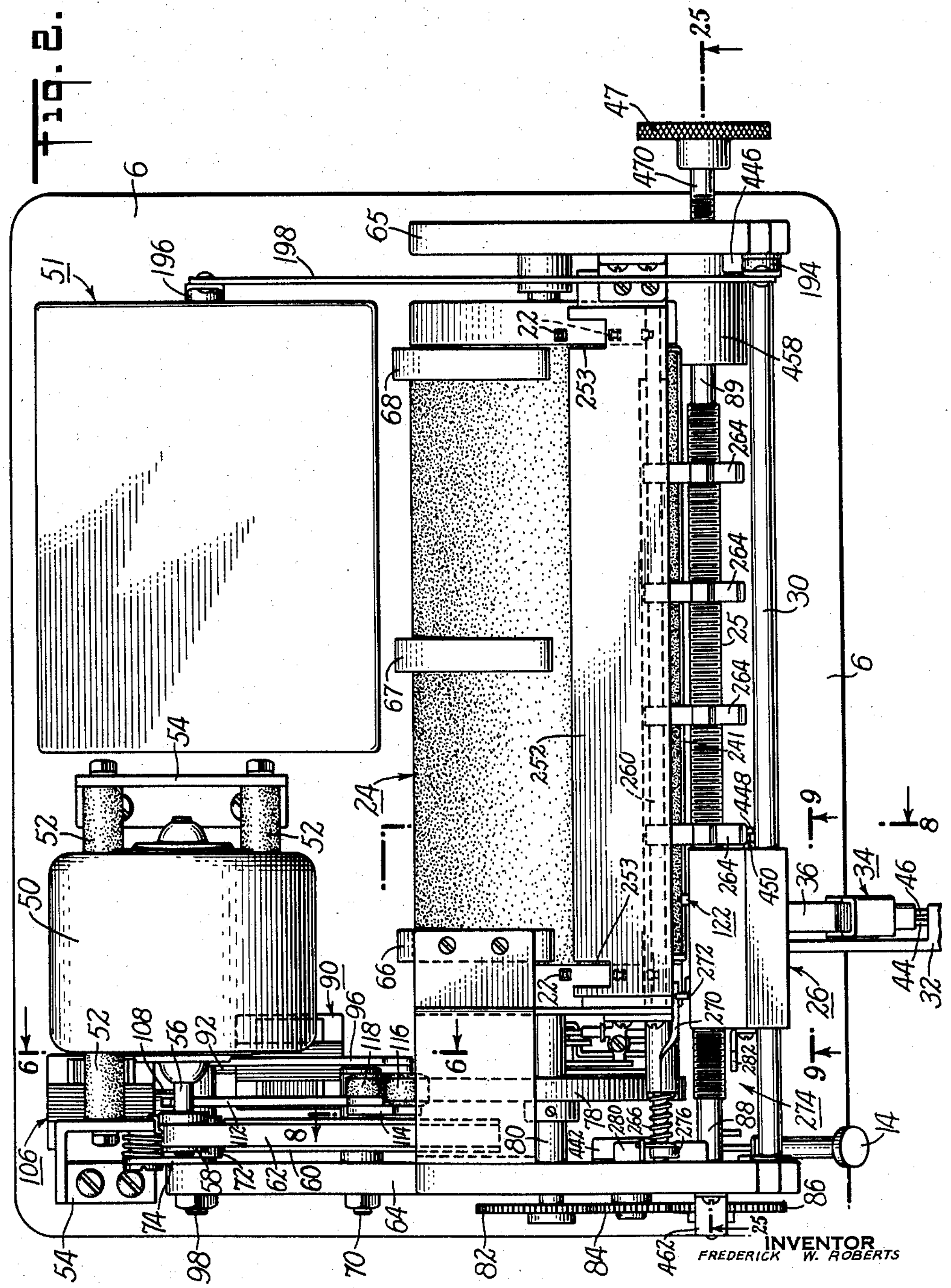
Figure 2 is a plan view from above of the machine in Figure 1 with the cover removed.

Referring to Figure 2 which shows a plan view from above of the machine of Figure 1 with the cover 8 removed, a suitable driving motor 50 is positioned in the rear left-hand corner of the base 6. This motor 50 operates a driving mechanism, disposed along the left hand side of the machine, to rotate the record supporting mandrel 24, disposed along the front portion of the base 6, and a feedscrew 25 parallel thereto which drives the carriage 26 transversely of the mandrel 24.

At the left-hand and right-hand ends of the base 6 are provided two vertical frame members 64 and 65, respectively, which are perpendicular to the base and support various portions of the mechanism, including the axle 80 of mandrel 24, the feedscrew 25, and the carriage guide rods, all as will hereinafter be described.

In addition, three other frame members or "bulkheads" 66, 67 and 68, are provided, perpendicular to the base 6 and intermediate and parallel to end frame members 64 and 65, to aid in positioning and holding the paper sheet record 2 when it is wrapped around record drum 24.

Figure 5:
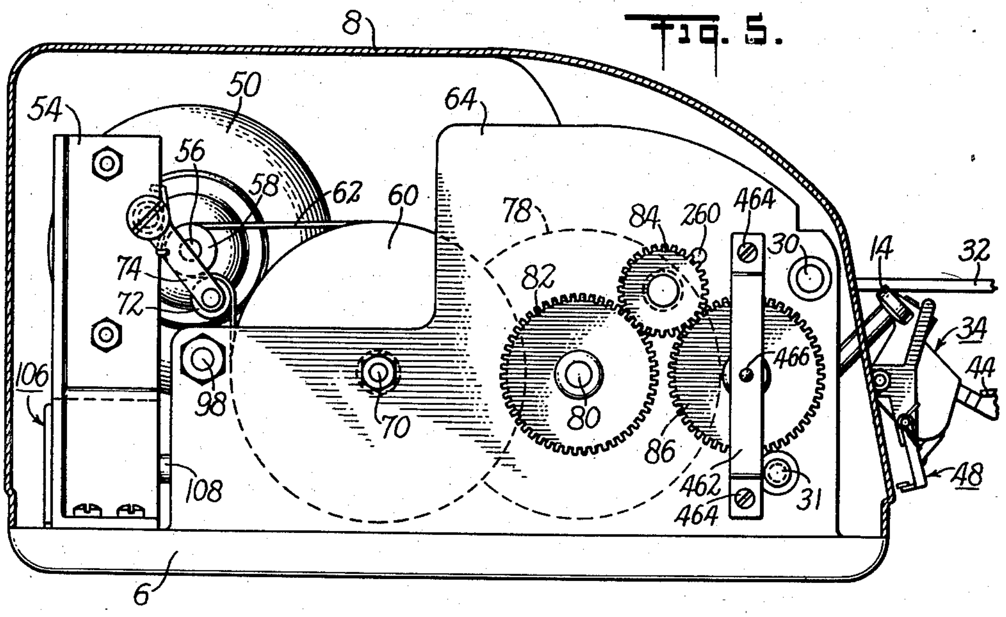
Figure 5 is an elevation of the left-hand end of the machine as shown in Figure 1 with the cover broken away to show more clearly the details of the driving mechanism.

The primary elements of the driving mechanism can be seen most readily by referring to Figure 5 showing an elevation of the left-hand end of the machine with the cover broken away. The motor 50 is secured by resilient anti-vibration mounting elements 52 (see Figure 2) to brackets 54 which, in turn, are fastened to the machine base 6. The shaft 56 of motor 50 carries a driving pulley 58 which drives a speed reduction pulley 60 through a belt 62. The pulley 60 is rotatably mounted on the end frame member 64 by means of a stud shaft 70. To maintain tension in the belt 62, an idler roller 72 is provided, rotatably mounted on a spring biased arm 74 pivoted to one bracket 54.

Figures 6, 7:
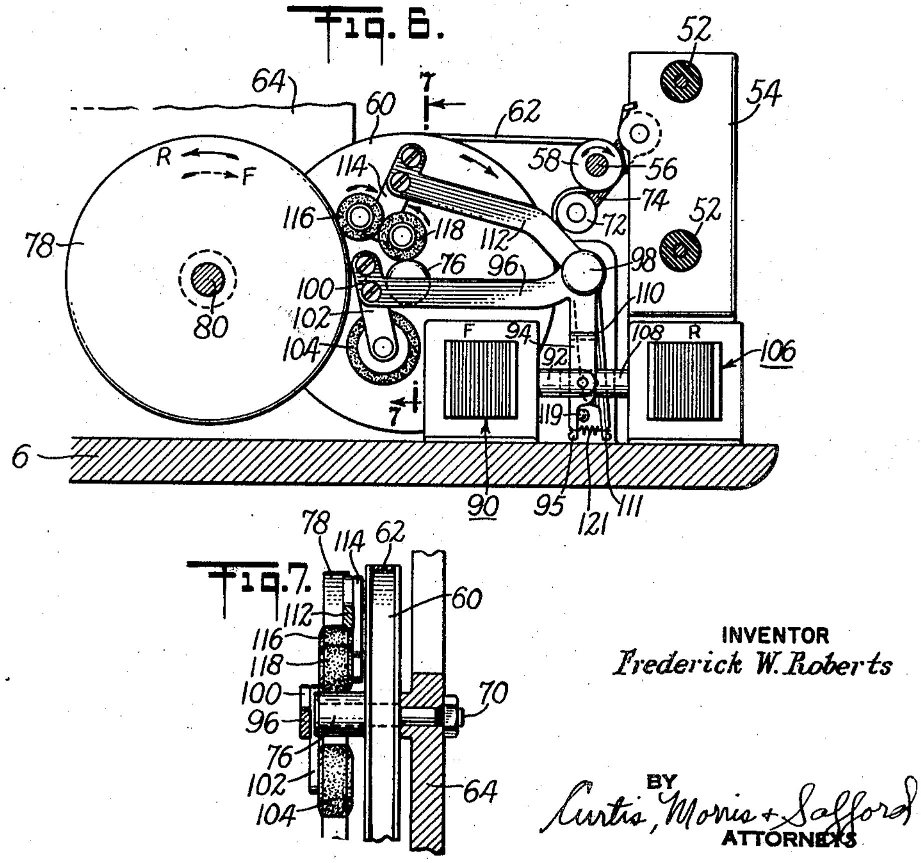
Figure 6 is a section taken on line 6—6 of Figure 2 showing details of the clutch control mechanism.
Figure 7 is a section taken on line 7—7 of Figure 6 showing another view of the clutch structure.

Turning to Figure 6, which shows the opposite side of this driving mechanism, the speed reduction pulley 60 has a cylindrical hub portion 76 projecting therefrom on the side opposite the end frame member 64 which, through a succession of rollers of a clutch mechanism hereinafter to be described in greater detail, drives another large diameter pulley 78 secured to the axle 80 of the record mandrel 24 to rotate it at the desired recording speed. Reverting to Figure 5, on the left-hand side of the frame member 64, mandrel axle 80 carries a gear 82, which, through an intermediate gear 84 rotatably mounted in this frame member 64 and a third gear 86 secured to the left-hand end 88 of feedscrew 25, drives the carriage along record drum 24. The diameters of the gears 82, 84 and 86 in the gear train between the record drum drive shaft 80 and the feedscrew shaft 88 are so selected as to provide the desired ratio between the pitch of the spiral sound track on the record sheet 2 and the pitch of the feedscrew 25. Although any suitable ratio may be used in this drive system, it has been found desirable to use a one to one ratio so that the feedscrew has precisely the same pitch as the sound track. However, a feedscrew having a pitch equal to a sub-multiple of pitch of the sound track may be used if desired. With such a construction there is no need for adjustment of the phasing control 47 except for infrequent occasions when the record sheet undergoes a dimensional change as will be described hereinafter.

As an illustration of actual values for this drive system which have been found to produce records of suitable quality while at the same time providing reasonable economy of record area, with a record drum of approximately 3½" in diameter rotated at a speed of 39 revolutions per minute, i. e. about two thirds of a revolution per second, recordings of a quality quite satisfactory for office dictating purposes can be made; and with a record sound track pitch of 52 lines per inch and a feedscrew of similar pitch, about 10 minutes of recording can be placed on an 8½" by 11" record sheet.

*Clutch mechanism*

The clutch mechanism for connecting the motor 50 to the driving arrangement just described is most clearly illustrated in Figure 6. It comprises two portions of substantially similar construction, one for driving the record supporting drum in a forward direction for loading the record thereon and for recording; and another for reversing the direction of the rotation of the drum when the record sheet is to be ejected. The operating element of the clutch mechanism which causes the record drum to be driven in a forward direction (clockwise as shown in Figure 6) is an electromagnet solenoid, generally indicated at 90. This electromagnet 90 is adapted, when energized, to attract an armature member 92, pivotally connected to the end of one arm 94 of a bell crank lever 96 which is pivotally mounted at its apex on a stud shaft 98 secured to the left end frame member

64. The other end 100 of the bell crank lever 96 carries loosely a cross-member 102 on the end of which is pivoted a friction roller or puck 104 in such a position that, when the electromagnet 90 is energized to attract armature 92, the bell crank 96 moves the puck 104 into engagement both with the driving hub 76 of pulley 60 and the periphery of mandrel drive pulley 78. This causes the pulley 78, and therefore the record supporting drum, to be driven in a clockwise direction, the motor pulley 58 revolving in a clockwise direction as shown in Figure 6. The clutch mechanism for reversing the direction of rotation of the record drum is substantially similar to that just described. It comprises a second electromagnet solenoid, generally indicated at 106, arranged to attract another armature member 108 secured to the end 110 of a second bell crank lever 112 pivoted on the same stud shaft 98. The other end of this bell crank lever 112 carries loosely a cross-member 114 on the end of which are rotatably mounted two frictional idler rollers or pucks 116 and 118 so positioned that, when the electromagnet 106 is energized to attract armature member 108, these rollers 116 and 118 are moved into contact with each other and with the driving hub 76 of pulley 60 and the periphery of the mandrel drive pulley 78, in much the same manner that puck 104 is moved therebetween for forward rotation of the mandrel. In the present instance, however, the interposition of two intermediate rollers instead of one causes the mandrel pulley 78, and therefore the record supporting drum, to be revolved in the reverse direction, counterclockwise as shown in Figure 6. In both of these mechanisms, the intermediate rollers 104, 116, and 118 are mounted on the loosely-carried cross-members 102 and 114 so that they can be pulled readily into proper driving position between pulleys 76 and 78 by the bell crank levers 96 and 112.

In order to maintain the clutch mechanism normally in declutched condition so that the record supporting drum is not rotated even though the motor 50 is energized, the frictional drive rollers 104, 116 and 118 are normally held out of engagement with driving hub 76 and the periphery of mandrel drive pulley 78 by means of a tension bias spring 121 extending between two portions 95 and 111 projecting downwardly from the ends 94 and 110 of the bell cranks 96 and 112, respectively. A stop pin 119 is provided between these downward projections 95 and 111 to determine the disengaged positions of the friction rollers 104, 116 and 118.

With the clutch mechanism just described, the record drum 24 can be driven in a forward direction for loading a record sheet thereon or for recording, or in a reverse direction for ejecting the record, dependent upon the selective energization of electromagnets 90 or 106; and, through the train of gears 82, 84 and 86, and the feedscrew 25, the carriage 26 is driven in synchronism with this rotation of the record drum 24 as described hereinbefore in connection with Figure 5.

*Carriage assembly*

Figure 3:
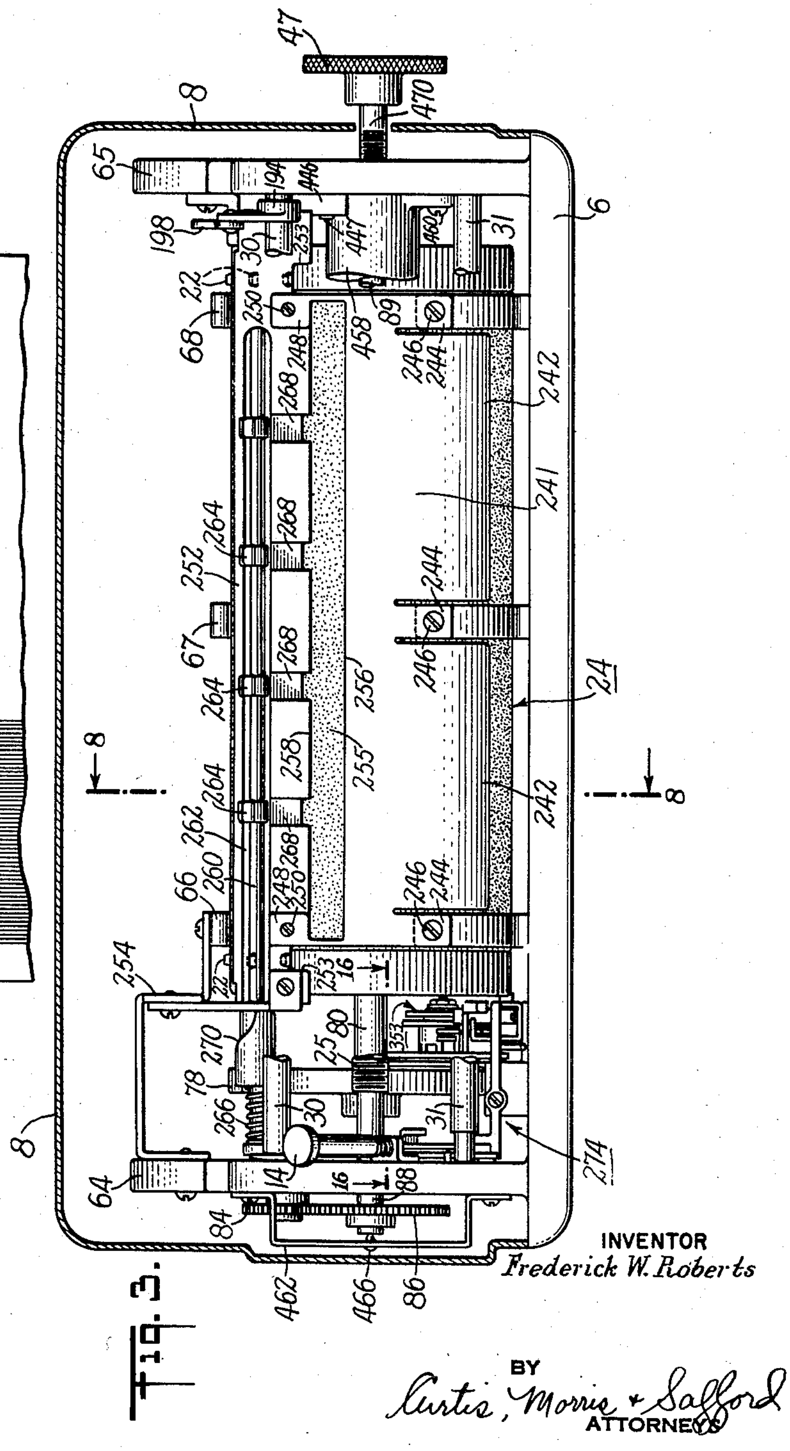
Figure 3 is a front elevation of the machine of Figure 1 with the housing, recorder carriage, feedscrew, and carriage guide rods broken away to show more clearly the record handling mechanism.
Figure 8:
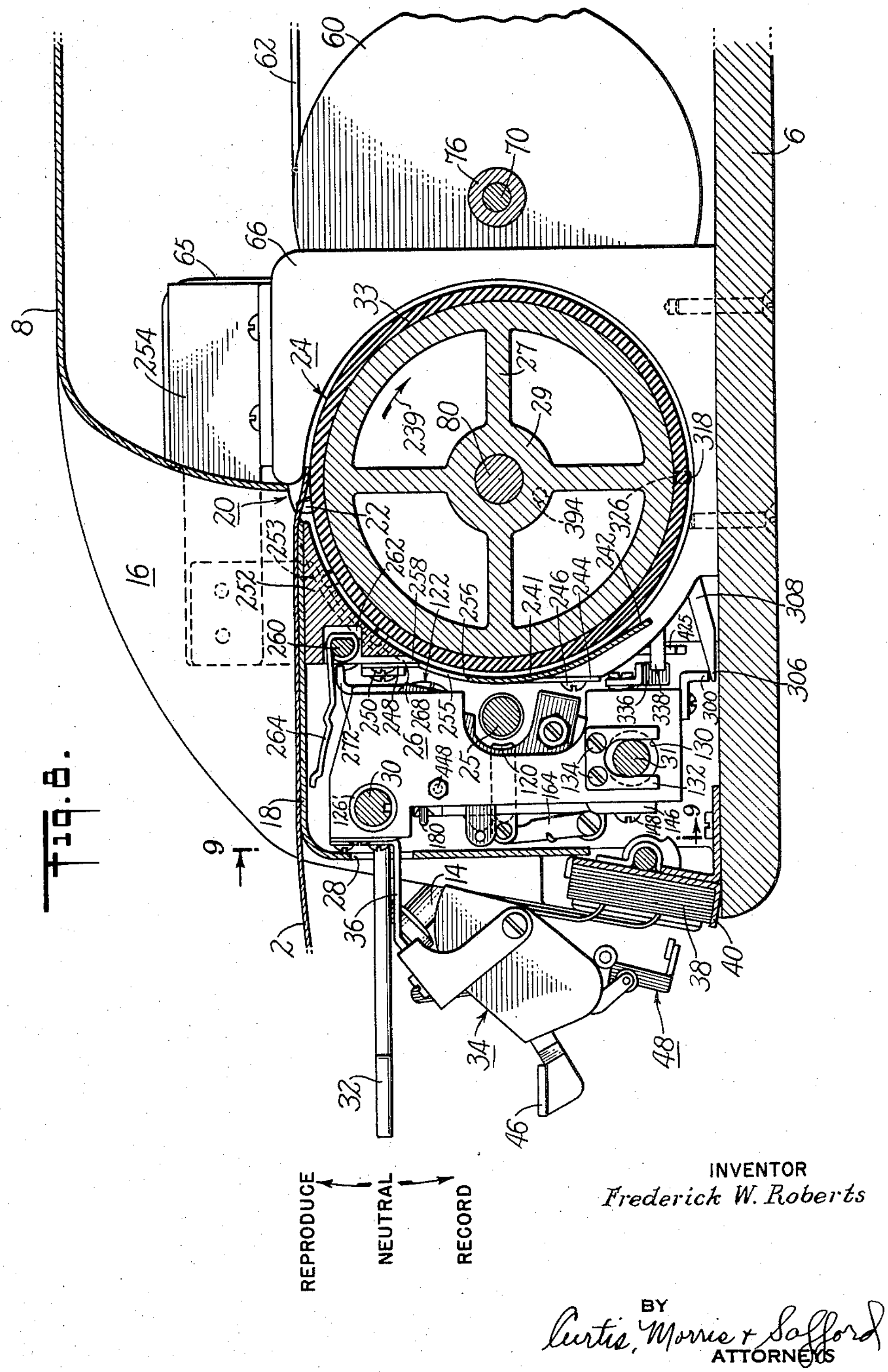
Figure 8 is an enlarged sectional elevation taken on lines 8—8 of Figures 2 and 3 to show details of the record supporting mandrel, the recorder carriage mounting, and the correction indicating device.

The position of the carriage 26 with respect to the record drum 24, as the carriage is traversed therealong by means of feedscrew 25, can best be seen by referring to Figure 8 which shows a cross-section of the machine taken on lines 8—8 of Figures 2 and 3. The carriage 26 slides on two support and guide rods 30 and 31 mounted along the front of the machine parallel to the axle 80 of the record drum 24 between the end frame members 64 and 65. It is moved therealong when a feednut 120 is engaged with the feedscrew 25 which also is mounted between end frame members 64 and 65 parallel to drum 24 and guide rod 30 and 31. This feednut 120 is moved into and out of engagement with feedscrew 25 by the record-reproduce control lever 32 through a linkage mechanism hereinafter to be described. It is moved out of engagement with the feedscrew when the lever 32 is moved to its central or "neutral" position, and is moved into engagement with the feedscrew when the control lever 32 is moved downwardly to "record" position or upwardly to "reproduce" position. At the same time, movement of this control lever 32 also operates other mechanisms to move a magnetic recording and reproducing head, generally indicated at 122, into and out of an engagement with the record sheet wrapped around the record drum 24.

Figure 9:
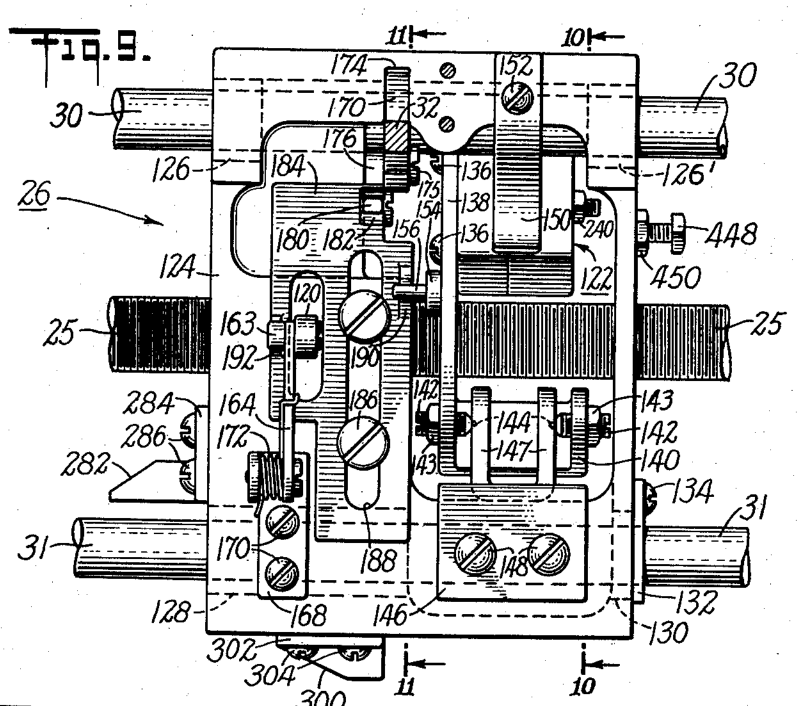
Figure 9 is an enlarged front elevation of the recorder carriage taken in the direction of arrows 9—9 in Figures 2 and 8.
Figure 10:
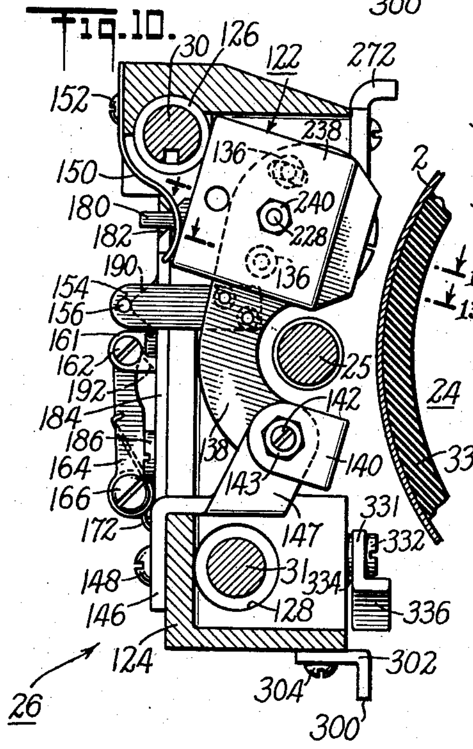
Figure 10 is a section of the carriage structure taken on line 10—10 of Figure 9.
Figure 11:
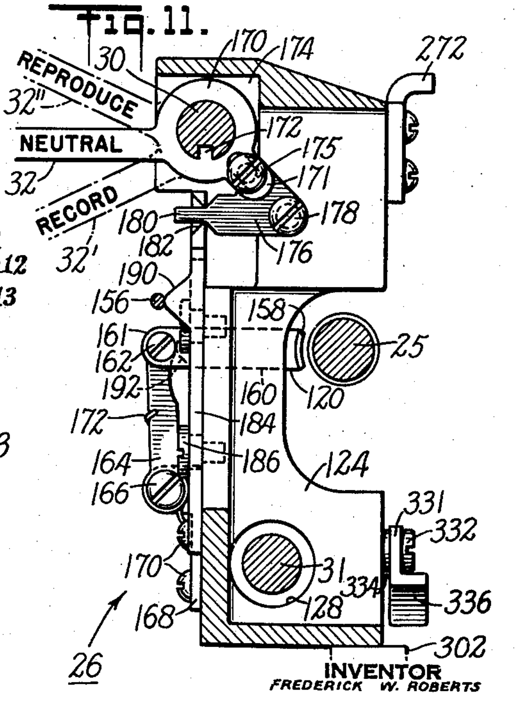
Figure 11 is another section of the carriage mechanism taken on line 11—11 of Figure 9.

The specific mechanism whereby these various functions of the carriage assembly 26 are accomplished is best illustrated by reference to Figures 9, 10 and 11. Figure 9 is a front elevation of the carriage assembly taken in the direction of arrows 9—9 in Figure 2, while Figures 10 and 11 are sections of the carriage assembly taken on lines 10—10 and 11—11, respectively, of Figure 9. The carriage 26 comprises an approximately rectangular metal frame 124 on which is mounted the control lever 32, the feednut 120, and the recording and reproducing head 122. The upper guide rod 30 passes through the top of the frame 124 through suitable bushings 126 and 126′ positioned in either side thereof. In order to prevent binding due to non-parallelism of the guide rods 30 and 31, the lower guide rod 31 passes through large clearance holes 128 and 130 in either side of the frame 124, and suitable alignment is effected by adjustment of a U-shaped giude plate 132 (see also Figure 8) fastened to the right side of the carriage frame 124, by means of screws 134 passing through horizontal slots in this guide plate and threaded into the carriage frame. Referring to Figure 8, when suitable forward and backward adjustment of the lower part of the carriage 26 is achieved by sliding the guide plate 132 to proper position, then screws 134 are tightened to maintain this alignment.

As shown in Figures 9 and 10, the magnetic recording head 122 is adjustably fastened by screws 136 to a lever 138 having a U-shaped portion 140 at its lower end. Pivot screws 142 are threaded through each side of this U-shaped portion 140 to coact with pivot seats 144 in each side of an upstanding U-shaped end 147 of a bracket 146 which is fastened to the front of the carriage frame 124 by means of screws 148. Lock nuts 143 are threaded on the outer ends of pivot screws 142 to lock them in their desired position. This arrangement provides a pivotal mounting for the recorder head 122 which permits it freedom of movement toward and away from the surface of the record material 2 on the drum 24, as shown in Figure 10, but limits its movements in all other directions so that it always meets the surface of the record in a vertical plane bearing a fixed positional relationship to the carriage position. The recording head 122 is always urged towards the surface of the drum 24 by means of a biasing leaf spring 150 attached to the upper front surface of the carriage frame 124 by means of a screw 152. A positioning arm 154 is rigidly fastened to the recorder supporting bracket 138 between its pivots 142 and the recorder head 122 to project forwardly beyond the surface of the carriage frame 124, as shown in Figure 10. A pin 156 is rigidly fastened to the forward end of this arm 154 and perpendicular thereto, so that movement of this pin in a forward direction, toward the left as shown in Figure 10, raises the recording head 122 from the surface of the record 2 wrapped around the drum 24, as will be hereinafter described in greater detail.

As shown in Figures 9 and 11, the feednut 120 is in the form of a rectangular bar. One end 158 of this feednut bar 120 has a grooved configuration to mesh with the feedscrew 25 when moved into contact with it. This bar-like feednut 120 is slidably mounted in a rectangular hole 160 passing through the body of the carriage frame 124. The other end 161 of the feednut 120 is pivotally fastened by a loosely fitting pivot screw 162 to an arm 164 fastened at its other end by a second pivot screw 166 to a right-angle bracket 168 which, in turn, is fixed to the front face of the carriage frame 124 by screws 170. Thus, referring to Figure 11, the feednut 120 may be moved into and out of engagement with the feedscrew 25 by rotation of the arm 164 about the pivot screw 166. As shown in Figure 9, the feednut 120 is biased toward the feedscrew 25 (to the right as is shown in Figure 11) by a spiral bias spring 172 coiled around pivot screw 166.

As mentioned above, control lever 32 is arranged to lift the feednut 120 and recorder head 122 out of engagement with the feedscrew 25 and the record 2, respectively, when it is moved to its intermediate or "neutral" position. This is accomplished with the mechanism shown in Figure 11. Control lever 32 is rotatably mounted on the upper guide rod 30. This guide rod 30 is pivotally mounted in the end frame members 64 and 65 as above described and is splined from end to end. The pivoted end of the control lever 32 is provided with a circular enlarged portion 170 which surrounds the guide rod 30 and carries an inwardly projecting key 172 which coacts with the spline in this guide rod. This enlarged end 170 of control lever 32 is carried in a slot 174 (see Figure 9) in the carriage frame 124 so that it may rotate about the axis of guide rod 30 while sliding therealong as the carriage is traversed across the record drum 24. This enlarged portion 170 of control lever 32 also carries a lug 171 extending downwardly and rearwardly therefrom to which one end of a small bell crank lever 176 is pivotally connected by means of a shoulder screw 175 passing through a slot in the end of lug 171. The apex of this bell crank 176 is pivotally secured to the carriage frame 124 by means of another shoulder screw 178, while the other end 180 of this lever 176 is reduced in cross-section and projects through a tapered hole 182 in a vertical plate 184. This plate 184 is mounted to slide up and down on the front face of the carriage frame 124 by means of two shoulder screws 186 passing through a vertical slot 188 in the plate 184 as shown in Figure 9. This slidable plate 184 carries two triangular cams 190 and 192 projecting from the front face of this sliding plate. When the control lever 32 is in its "neutral" position, the apex of cam 190 is positioned under the pin 156 projecting from arm 154 secured to the pivoted recorder mounting arm 138, and the apex of cam 192 is positioned under a round cap 163 on the end of the pivot screw 162 connecting the feednut 120 with its supporting lever 162, as can be seen most easily in Figures 10 and 11. Thus, when the control lever 32 is moved to its extreme lower or "record" position 32′, or its upper or "reproduce" position 32″, as shown in Figure 11, its enlarged portion 170 turns with the guide rod 30 around its axis, rotating the lug 171 and thus causing rotation of the small bell crank 176 which, by means of its reduced free end 180 and slot 182 in the sliding plate 184, causes this plate to slide upwardly or downwardly, respectively, so that the cams 190 and 192 slide out from under pin 156 and pivot screw 162, thus causing feednut 120 and recorder head 122 to move to the right into engagement, respectively, with feedscrew 25 and record drum 24 in response to the urging of their biasing springs 172 and 150. Thus carriage 26 may be moved freely when control lever 32 is in "neutral" position, and will be driven by the feedscrew 25 when the control lever 32 is in either "record" or "reproduce" position so that the recorder head 122 follows a spiral sound track on a record surface 2 on drum 24.

As mentioned above, the guide rod 30 is splined and is pivoted at its ends in the end frame standards 64 and 65 so that it rotates through the same angle as control lever 32 when the latter is moved from one position to another. Referring to the right-hand side of Figure 2, this motion is utilized to rotate a lever arm 194 secured to the right-hand end of splined guide rod 30 through a connecting link 198 to rotate a switch arm lever 196 to operate a switch (not shown) mounted in the amplifier 51 to reverse the connections of this amplifier when the machine is changed from recording to reproducing condition, and vice versa, as shown, for example, in U. S. Patent No. 2,143,819 to L. D. Norton.

*Recording and reproducing head*

Details of the magnetic recording and reproducing head 122 may be more readily understood by reference to Figures 12, 13, 14 and 15. This head 122 effectively comprises a closed magnetic circuit, the operative elements of which are generally indicated at 200 in Figure 14, with a small non-magnetic gap 202 in one side thereof and with two coils 204 and 206 each surrounding an opposite leg of this magnetic circuit. This magnetic circuit 200 comprises two symmetrical and oppositely positioned twin flat pole pieces 208 and 210 shaped more or less like hockey sticks and made of high permeability magnetic material magnetically joined at one extremity by a U-shaped piece 212 of similar material whose side members overlie the similar and contiguous portions of pole pieces 208 and 210 which are mechanically joined at the other ends by an arcuate sheet 214 of non-magnetic metal so as to leave these ends separated magnetically by the small air gap 202.

Figure 12:
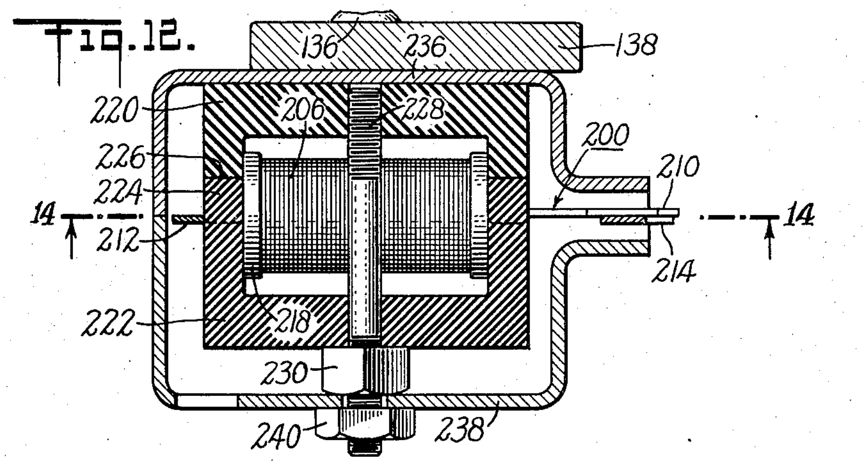
Figure 12 is an enlarged cross-section of the magnetic recording and reproducing head taken on line 12—12 of Figure 10.
Figure 13:
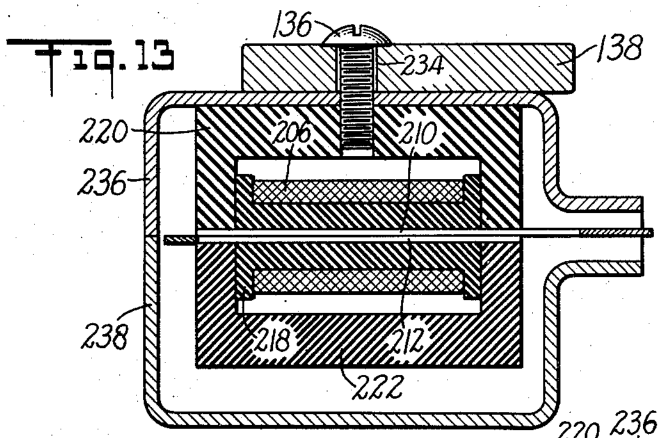
Figure 13 is another section of this magnetic head taken on line 13—13 of Figure 10.
Figures 14, 15:
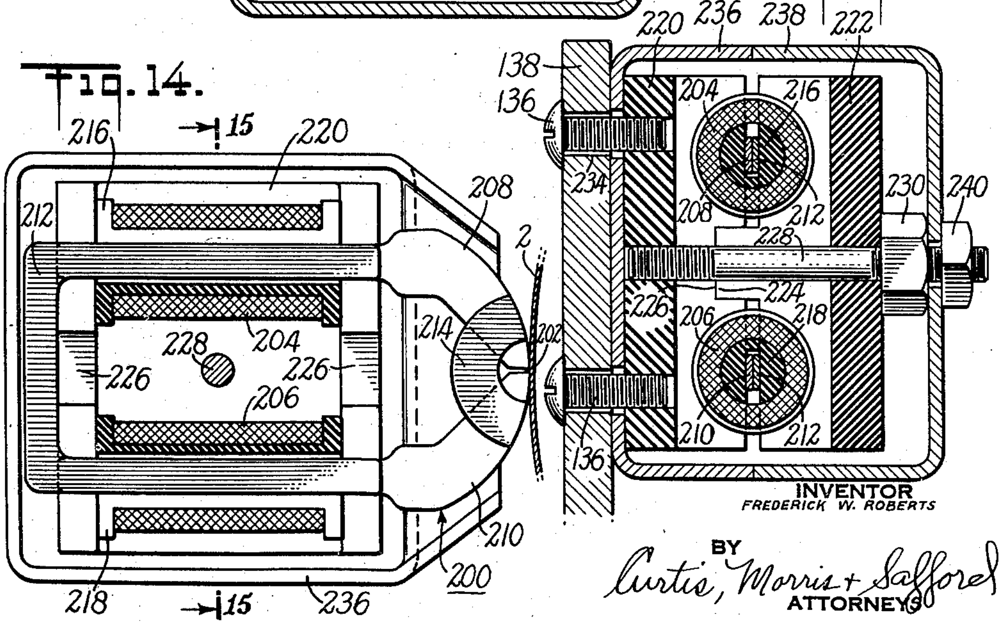
Figure 14 is a further cross-section of the magnetic head taken on line 14—14 of Figure 12.
Figure 15 is an additional cross-section of this magnetic head taken on line 15—15 of Figure 14.

As shown in Figure 15, the coils 204 and 206 are wound on two round bobbins 216 and 218 having rectangular axial slots therethrough to receive the flat magnetic core pieces 208, 210 and 212 forming the magnetic circuit 200. Referring to Figure 13, these flat cores are held together where they emerge from the coil bobbins 216 and 218 by two U-shaped clamps 220 and 222 of non-magnetic material. In order to prevent these two clamps 220 and 222 from moving laterally during assembly, the piece 222 (see Figure 15) is provided on either end with a tongue 224 which fits into a rectangular groove 226 in clamp 220. In order to hold these clamping blocks 220 and 222 together, a stud bolt 228 is threaded into the center of block 220, as shown in Figure 15, and clamped by means of a nut 230 threaded to its other end. In turn, this assembly is fastened to the pivoted pickup supporting arm 138, as shown in Figure 10, by means of two screws 136 which pass through holes 234 in the bracket 138 and are threaded into the clamping block 220 as shown in Figure 15. One of the holes 234 is enlarged to permit adjustment of the position of the recording head 122 with respect to the arm 138. Interposed and clamped between the supporting arm 138 and the clamping block 220 is one half 236 of a cup-shaped housing. This half housing 236 forms, together with a companion half 238, which is held in place by a nut 240 threaded on to the outer end of stud bolt 228 as shown in Figures 12 and 15, a housing completely enclosing the coils and core structure of the head 122. This housing, formed of the two members 236 and 238, preferably is made of Permalloy or some other suitable material of similar magnetic characteristics to shield these elements from stray magnetic fields.

When the two coils 204 and 206 of the head 122 are connected in series and a sound signal current is passed therethrough, it is apparent that, if a magnetizable surface 2 is moved past the air gap 202, as shown, for example, in Figure 14, the magnetizable material thereon will tend to be magnetized in proportion to the current flowing through the coils in the manner usual in magnetic recording; and, conversely, when a variably magnetized surface 2 is drawn past the air gap 202, a variable magnetic flux will be produced in the magnetic circuit 200 which will induce in the coils 204 and 206 a voltage which is a function of this magnetization and which may be amplified and translated into sound in the manner usual in magnetic sound reproduction.

In order that there will be no cross talk between sounds recorded on adjacent sound tracks, it is necessary that the width of the magnetic pole pieces 208 and 210 at the point where they make contact with the surface of record sheet 2 be less than the distance between adjacent sound tracks, i. e. less than the pitch of the sound track spiral. For a machine of the characteristics cited above as an illustration in which the sound track has a pitch of 52 lines per inch so that the distance between adjacent tracks is about .0193 inch, pole pieces having a width of about .016 inch have been found to operate satisfactorily.

*Record supporting drum*

Although the record drum 24 around which a record sheet 2 is wrapped for recording and reproducing, may be of any convenient construction provided it is made of non-magnetic material, it has been found desirable to make it as light as possible thus reducing its inertia to a minimum for easy starting and stopping in rapid response to operation of the clutch mechanism. This insures uniformity of recording speed and minimizes loss of recording area caused by over run during the period between declutching of the record drum drive and the time that the drum comes to a stop. In the present machine this has been accomplished as shown in Figure 8 by forming the drum of a hollow aluminum casting provided with spokes 27 and hubs 29 at either end suitably secured to the mandrel drive shaft 80.

Further, it has been found that, if the surface of the record drum 24 is made of metal or of other hard substance, slight irregularities and discontinuities in its surface or in the record sheet 2 tend to make the recorder head 122 bounce as it moves over the surface of the drum. This motion of the recorder head tends to introduce background noise in the recording. In order to prevent this noise-producing motion of the head 122, the surface of the record drum 24 over which the head passes is coated with a layer 33 of rubber or other suitably resilient material which tends to damp out such oscillations so that the head 122 at all times rides in smooth and intimate contact with the coated surface of the record sheet 2.

*Record handling mechanism*

The mechanism whereby a rectangular paper sheet record 2 is drawn into the machine, wrapped around the record drum 24, properly aligned thereon, driven relative to the recording head 122 while recording and reproducing, and ejected from the machine when desired, can best be seen by reference to Figures 2, 3, and 8. As described above, in this machine, the rectangular paper sheet record 2 is drawn into the machine through the slot 20 by the teeth 22 on the record drum 24 and wrapped therearound with a slight overlap. Thereafter, for recording, the sound track is placed on this record in the form of a cylindrical spiral by the synchronized rotation of the drum 24 and the traversing of the carriage 26 therealong, in the manner usual with cylindrical record machines. However, after a record sheet has been removed from the machine, the sound tracks take the form of a plurality of parallel lines running lengthwise thereon, so they would appear as the lines 5 in Figure 4, if they were visible. In order that this machine may transcribe such a record, it is necessary that when a recorded record sheet is placed in the machine for transcription, the overlapping ends of the record sheet 2 assume the identical longitudinal position with respect to each other that they were in when the record was made so that the ends of each of these parallel sound tracks will assume such a position as once again to form the original continuous spiral sound track around the cylindrical surface formed by the record sheet when it is wrapped around the record drum 24. Accordingly therefore, it is an important function of the record-handling mechanism of this machine invariably to position a record sheet 2 on the drum 24 in precisely the same position regardless of the number of times that the record sheet is removed therefrom and returned thereto; and, in accordance with the present invention, this effect is achieved simply and efficiently. As pointed out above and as shown in Figure 8, the drum 24 is provided with three sprocket-like teeth 22 in a line at each end of the drum. These teeth are rectangular in cross-section, and are precisely dimensioned and positioned to coact with the sprocket holes 4 and 4' along each side of the record paper 2 as shown in Figure 4. It will be noted that although the sprocket holes 4 along the left side of the rectangular record sheet 2 are of precisely the same length as the holes 4' along the right side of the sheet, the latter are considerably wider than the former. This additional hole width is provided to permit longitudinal motion of one end of the record sheet should it suffer a dimensional change due to such conditions as change in humidity and the like as will be discussed hereinafter in greater detail. These teeth 22 and holes 4 serve to grip the record sheet uniformly at all times so that, when the sheet is smoothly wrapped around the drum 24, the overlapping ends of the record sheet 2 are precisely coextensive. In order to insure the record sheets being smoothly wrapped around the record drum 24, the three bulkheadlike members 66, 67 and 68, which are intermediate and parallel to the end frame members 64 and 65, encircle the record drum 24 for about three quarters of its periphery as shown in Figure 8. The inner faces of these members are smooth and parallel to the surface of the drum 24 and are separated therefrom by an amount slightly greater than the thickness of the record sheet itself. Thus, when the drum 24 is rotated in the direction of the arrow 239 in Figure 8 to load a record sheet thereon, these bulkhead members tend to press the record sheet firmly against the periphery of the drum 24 and to hold it snugly against it during recording and reproducing operations. This action of the bulkhead members 66, 67 and 68 is augmented on the forward side of the record drum 24 by a curved guide plate 241 extending along substantially the entire length of the record drum and curved to conform and be substantially parallel to the surface of the drum in the same manner as the inner surfaces of the bulkhead members 66, 67 and 68. The lower edge 242 of this plate 241 is bent slightly away from the surface of the drum as shown in Figure 8, to insure that the leading edge of a record sheet 2 does not strike this edge 242 during loading of the machine. This curved guide plate 241 is held in place along its lower side by means of tab-like portions 244 forming part of the guide plate itself and bent into a vertical plane to be fastened to the ends of bulkhead members 66, 67 and 68 by means of screws 246. The upper edge of the guide plate 241 is fastened by means of other tab-like portions 248 with screws 250 which are threaded into a longitudinal guide member 252 extending along the length of the drum 24 at its upper forward face. This longitudinal guide member 252 is supported at one end by the right-hand frame member 65 and at its other end by a bracket structure 254 secured to the left-hand bulkhead member 66 and to the left-hand frame member 64. The inner side of this guide member 252 adjacent the drum 24 is shaped to parallel the surface of the drum 24 in the same manner as the inner surfaces of bulkheads 66, 67 and 68 and guide plate 241 and is provided at both ends with internal grooves 253 to permit the passage of the record engaging pins 22 on the drum 24. In this manner, these elements form a structure that completely encircles the record drum 24 to hold any record sheet wrapped therearound closely and smoothly on its surface. Referring for a moment to Figure 3, the only exception to this complete encirclement of the drum, besides the slot 20 through which the record sheet is inserted to be wrapped around the drum and through which it is ejected when it is removed therefrom, is a slot 255 formed by the upper edge 256 of guide plate 241 and the lower edge 258 of upper guide member 252. This slot 255 is provided to permit the recording head 122 to engage the surface of a record wrapped around the drum 24 throughout its entire length as the drum rotates and the recording head is traversed.

*Recording*

To commence recording the record-reproduce lever 32 is depressed to "record" position and, if a hand microphone is used, it is removed from its microphone hook. This closes the circuit to the motor 50 to start it rotating, and closes the circuit to the forward clutch solenoid 90 so that it is ready to operate. Thereafter, when the push switch on the microphone handle is closed, the forward clutch solenoid is energized and dictation may commence with the record drum rotating each time the microphone switch is closed during a period of dictation and stopping each time it is opened.

During the recording operation, in order to insure discontinuance of carriage travel (see Figure 2) before the recording head 122 runs off the right-hand edge of the record sheet 2, a limit switch 446 is mounted on the right-hand frame member 65. This limit switch 446 is provided with a set of normally-closed contacts operated by a push rod 447 to open the energizing circuits to the forward clutch solenoid 90 so as to disconnect the record drum from the driving motor when the carriage 26 reaches the desired limit of travel at the right-hand side of the machine. In addition, a visible or audible signal also may be provided to indicate to the dictator that this limit position has been reached so that the fully recorded record on the machine may be replaced by a fresh one. The particular carriage position at which this operation takes place is determined by the setting of a screw 448 threaded into the right-hand side of the carriage 26 and provided with a lock nut 450 to fix it firmly in its adjusted position.

*Reproducing*

If it is desired to listen back to any portion of the recording already made, the control lever 32 is moved to "neutral" position, the carriage 26 may be pushed to the left to the point to be reproduced, and then the control lever is moved upwardly to reengage the feedscrew and once more to place the electromagnetic head 122 against the record sheet 2. This upward motion of the control lever 32 also reverses the connection to the amplifier 51 so, thereafter, when the push switch on the microphone is closed, the microphone acts as a loudspeaker to reproduce the recorded portion. If a desk microphone and foot switch arrangement is used, a similar procedure is followed except that the microphone cradle switch and the microphone hand switch are replaced by switches in the foot control, for example, as shown in the above-mentioned Patent No. 2,374,561.

If desired, this machine also may be equipped with the usual interlocking signal arrangement which causes a buzzer or other signal to sound at all times except when the control lever 32 is depressed to condition the machine for recording, i. e. to signal whenever this lever 32 is in its "neutral" position, or when it is in its "reproduce" position but not actually reproducing, as, for example, in accordance with the disclosure of U. S. Patent No. 1,989,783 to T. H. Beard et al.

As many possible embodiments may be made of the above invention without departing from the scope thereof, it is to be understood that all matter herein set forth or shown in the accompanying drawings is to be interpreted as illustrative only and not in a limiting sense.

I claim:

1. A dictation machine comprising a creasible, flexible and limp rectangular nonmagnetic record sheet carrying dispersed magnetizable particles, a revolvable support adapted to carry the sheet in the form of a closed loop, the sheet being externally wrapped on the support, means for holding the sheet on the support with the leading edge portion driven with the support in substantially circumferential relation to the support, and with the trailing edge overlapping the leading edge with freedom for movement circumferentially of the support, and a magnetic scanning device yieldingly urged against a record sheet on the support, in a scanning path repeatedly crossing the overlapped edges of the sheet to provide for ironing out of any crease present in the record sheet intermediate the leading and trailing edges by movement of the trailing edge of the sheet circumferentially of the support.

2. A machine according to claim 1 in which the revolvable support comprises a member having a cylindrical record supporting surface about which the record is flexed to the form of a cylindrical loop, and in which the magnetic scanning device is yieldingly urged against a record sheet flexed about the cylindrical surface of said member.

3. A construction according to claim 1 and further including means for re-establishing alignment between portions of the path interrupted by the line of overlapping after removal of the record sheet and reinsertion in the same or similar machine, said alignment means comprising elements projecting radially from the surface of the support at opposite ends of the support at least in the region of overlapping of the leading and trailing edges of the sheet, said elements engaging the edges of the sheet lying adjacent the ends of the support when the sheet is wrapped thereon.

4. A dictation machine comprising a creasible and flexible nonmagnetic record sheet carrying dispersed magnetizable particles, said sheet having leading and trailing edges, a revolvable support adapted to carry the sheet in the form of a closed loop, controllable drive mechanism for revolving the support in one direction, the sheet being externally wrappable on the support with a trailing edge portion overlapping a leading edge portion with freedom for movement circumferentially of the latter portion and thus of the support, means for securing a leading edge portion of the sheet on the support in constant predetermined relation to the record supporting surface of the support, a magnetic scanning device yieldingly urged against the record sheet when on the support, and means for effecting relative movement between scanning device and support axially of the latter, so that said device when the support is revolved has an effective scanning path repeatedly crossing the overlapped edge portions of the sheet thereon, and the enforced flattening, by the scanning device, of any crease present in the record sheet intermediate the leading edge portion and the trailing edge is accommodated by movement of the trailing edge of the sheet circumferentially of the support.

5. A dictation machine comprising a creasible and flexible rectangular nonmagnetic record sheet carrying dispersed magnetizable particles, a revolvable support adapted to carry the sheet in the form of a closed loop, controllable drive mechanism for revolving the support in one direction, the sheet being externally wrapped on the support with the trailing edge portion overlapping the leading edge with freedom for movement circumferentially of the support, the support and the leading edge of the sheet being provided with interengageable fastening means providing for drive of the leading edge of the sheet with the support in substantially constant circumferential relation thereto, and a magnetic scanning device yieldingly urged against a record sheet on the support in a scanning path repeatedly crossing the overlapped edges of the sheet so that the enforced flattening of any crease present in the record sheet intermediate the leading and trailing edges by the scanning device is accommodated by movement of the trailing edge of the sheet circumferentially of the support.

6. A construction in accordance with claim 5 in which the interengageable fastening means provided on the support and on the record sheet comprise a hook and an eye provided respectively on said support and said sheet.

7. A dictation machine comprising a creasible and flexible rectangular nonmagnetic record sheet carrying dispersed magnetizable particles, a revolvable support adapted to carry the sheet in the form of a closed loop, controllable drive mechanism for revolving the support in one direction, the sheet being externally wrapped on the support with the trailing edge portion overlapping the leading edge with freedom for movement circumferentially of the support, the support and the leading edge of the sheet being provided with interengageable fastening means providing for drive of the leading edge of the sheet with the support in substantially constant circumferential relation thereto, the fastening means comprising elements interengageable and separable by relative movement toward and away from the surface of the support, and a magnteic scanning device yieldingly urged against a record sheet on the support in a scanning path repeatedly crossing the overlapped edges of the sheet so that the enforced flattening of any crease present in the record sheet intermediate the leading and trailing edges by the scanning device is accommodated by movement of the trailing edge of the sheet circumferentially of the support.

8. A dictation machine comprising a flexible, limp and creasible rectangular nonmagnetic record sheet carrying dispersed magnetizable particles, a rotatable drum on which the record sheet is externally wrappable, the drum having a circumferential dimension less than the dimension of the sheet in the direction of wrapping of the sheet on the drum to provide for overlapping of opposite edge portions of the sheet when the sheet is wrapped upon the drum, controllable drive mechanism for rotating the drum in a direction such that the outer lapped edge portion of the sheet is in trailing position, the leading edge portion of the sheet and the drum having cooperating interengageable fastening means providing for drive of the sheet with the drum in substantially constant circumferential relation, the fastening means cooperating with the leading edge portion only of the sheet and the remainder of the sheet from said leading edge portion to the trailing edge having freedom for movement circumferentially of the drum, and a magnetic scanning device and traverse mechanism therefore for shifting the scanning device axially of the drum when the drum rotates to provide for scanning a track having a multiplicity of turns each crossing the lapped edges of the sheet, the scanning device having yielding pressure contact with the sheet when wrapped on the drum and providing for smoothing or ironing out of the limp sheet from the leading edge portion to the trailing edge with each revolution of the drum.

No references cited.